: US 6,504,297 B1

(12) United States Patent
Heo et al.

(10) Patent No.: US 6,504,297 B1
(45) Date of Patent: Jan. 7, 2003

(54) GREEN-EMITTING PHOSPHOR COMPOSITION AND CATHODE RAY TUBE MANUFACTURED USING THE SAME

(75) Inventors: Gyeong-jae Heo, Anyang (KR); Won-ho Yoon, Suwon (KR); Joa-young Jeong, Sungnam (KR)

(73) Assignee: Samsung SDI Co., Ltd., Kyungki-Do (KR)

( * ) Notice: Subject to any disclaimer, the term of this patent is extended or adjusted under 35 U.S.C. 154(b) by 0 days.

(21) Appl. No.: 09/547,875

(22) Filed: Apr. 12, 2000

(30) Foreign Application Priority Data

Apr. 14, 1999 (KR) .............................. 99-13148

(51) Int. Cl.$^7$ .......................... H01J 29/20; C09K 11/08
(52) U.S. Cl. .................... 313/467; 252/301.45
(58) Field of Search ................... 252/301.4 F, 301.4 S; 313/485, 467, 468, 486, 487, 503

(56) References Cited

U.S. PATENT DOCUMENTS

| 4,336,313 A | 6/1982 | Peters et al. |
| 4,559,469 A | 12/1985 | Welker et al. |
| 6,168,892 B1 * | 1/2001 | Ohara et al. ................... 430/45 |
| 2001/0008363 A1 * | 7/2001 | Sanghera et al. ........... 313/496 |
| 2001/0013591 A1 * | 8/2001 | Park et al. ............ 252/301.4 F |

FOREIGN PATENT DOCUMENTS

| JP | 405089800 A | * | 4/1993 | ............ H01J/31/10 |
| KR | 1982-0001593 | | 9/1982 | |

* cited by examiner

Primary Examiner—Nimeshkumar D. Patel
Assistant Examiner—Thelma Sheree Clove
(74) Attorney, Agent, or Firm—Lowe Hauptman Gilman & Berner, LLP

(57) ABSTRACT

Disclosed is a green-emitting phosphor composition comprising: 75 to 95 wt % of a phosphor of the formula $Y_2SiO_5$:Tb, and 5 to 25 wt % of a phosphor of the formula $SrGa_2S_4$:Eu. The composition has excellent luminance, degradation and afterglow characteristics so that it can be advantageously used for manufacturing projection type CRTs.

3 Claims, 1 Drawing Sheet

GREEN-EMITTING PHOSPHOR COMPOSITION AND CATHODE RAY TUBE MANUFACTURED USING THE SAME

BACKGROUND OF THE INVENTION

1. Field of the Invention

The present invention relates to a green-emitting phosphor composition and a cathode ray tube (CRT) manufactured using the same, and more particularly, to a green-emitting phosphor composition having improved luminance characteristics, degradation characteristics and afterglow characteristics, and a CRT adopting the same.

2. Description of the Related Art

Recently, with the advent of HDTV (high definition television) broadcasting, demands for projection type CRTs which can attain 40-inch or larger screens have been increasing for both home and business purposes. In the case of a projection type CRT, the fluorescent screen of a projection type CRT requires a brightness of several to several tens of times that of a direct viewing type CRT because an image is projected onto 40-inch, 52-inch or lager screens. Thus, the fluorescent screen of a projection type CRT should be excited under the condition in which a high-density current of several to several tens of times that of a direct viewing type CRT is applied. However, this results in deterioration of luminance, which is particularly serious in green-emitting phosphors which contribute to about 70% of the luminance.

As components of the conventional green-emitting phosphor, $Y_3Al_5O_{12}$:Tb, $Y_3(Al, Ga)_5O_{12}$:Tb, LaOCl:Tb, $Zn_2SiO_4$:Mn, $InBO_3$:Tb or $Y_2SiO_5$:Tb, which have improved characteristics compared to $Y_2O_2S$:Tb, $Gd_2O_2S$:Tb or ZnS:Cu, Al, are used alone. However, these single-substance green-emitting phosphors do not fulfil all characteristics required for a projection type CRT. Thus, mixed green-emitting phosphors obtained by mixing $Zn_2SiO_4$:Mn or $InBO_3$:Tb with $Y_3(Al, Ga)_5O_{12}$:Tb, $Y_2SiO_5$:Tb or pigment-attached $Y_3(Al, Ga)_5O_{12}$:Tb in an appropriate mixture ratio are put into practical use.

For example, Japanese Patent Laid-Open Publication No. hei 4-161483 describes a mixed green-emitting phosphor obtained by mixing $Zn_2SiO_4$:Mn with $Y_3(Al, Ga)_5O_{12}$:Tb in order to improve color purity. Also, U.S. Pat. No. 4,559,469 describes a mixed green-emitting phosphor obtained by mixing $Zn_2SiO_4$:Mn with $Y_2SiO_5$:Tb in order to improve color purity.

However, the $Zn_2SiO_4$:Mn phosphor used for improving color purity in the mixed green-emitting phosphor for a projection type CRT, has poor degradation characteristic under the condition in which a high-density current is applied, while exhibiting excellent color purity. Thus, a decrease in the luminance is large with the passing of time. Also, due to a long afterglow time, the amount of the $Zn_2SiO_4$:Mn phosphor mixed with another phosphors is restricted. To avoid such a problem, there has been an attempt to improve luminance and afterglow characteristics by mixing a fluoride compound instead of the $Zn_2SiO_4$:Mn phosphor, as disclosed in U.S. Pat. No. 4,336,313.

Conclusively, the $Zn_2SiO_4$:Mn phosphor mixed for improving color purity in the mixed green-emitting phosphor for a projection type CRT has a very long afterglow time, that is, about 30 ms, and has poor luminance and degradation characteristics. Thus, as the amount of the mixed $Zn_2SiO_4$:Mn phosphor increases, luminance and degradation characteristics of the mixed green-emitting phosphor become poorer.

SUMMARY OF THE INVENTION

To solve the above problems, it is an object of the present invention to provide a new green-emitting phosphor composition which can replace a conventional green-emitting phosphor composition containing a $Zn_2SiO_4$:Mn phosphor.

It is another object of the present invention to provide a cathode ray tube (CRT) manufacturing using the new green-emitting phosphor composition.

Accordingly, to achieve the first object, there is provided a green-emitting phosphor composition comprising:75 to 95 wt % of a phosphor of the formula $Y_2SiO_5$-Tb, and 5 to 25 wt % of a phosphor of the formula $SrGa_2S_4$:Eu.

Preferably, the phosphor of the formula $Y_2SiO_5$:Tb contained in the composition is 85 to 95 wt %, and the phosphor of the formula $SrGa_2S_4$:Eu contained in the composition is 10 to 15 wt %.

To achieve the second object, there is provided a cathode ray tube manufacturing using the green-emitting phosphor composition.

BRIEF DESCRIPTION OF THE DRAWINGS

The above objects and advantages of the present invention will become more apparent by describing in detail a preferred embodiment thereof with reference to the attached drawing in which.

DETAILED DESCRIPTION OF THE INVENTION

Figure 1:
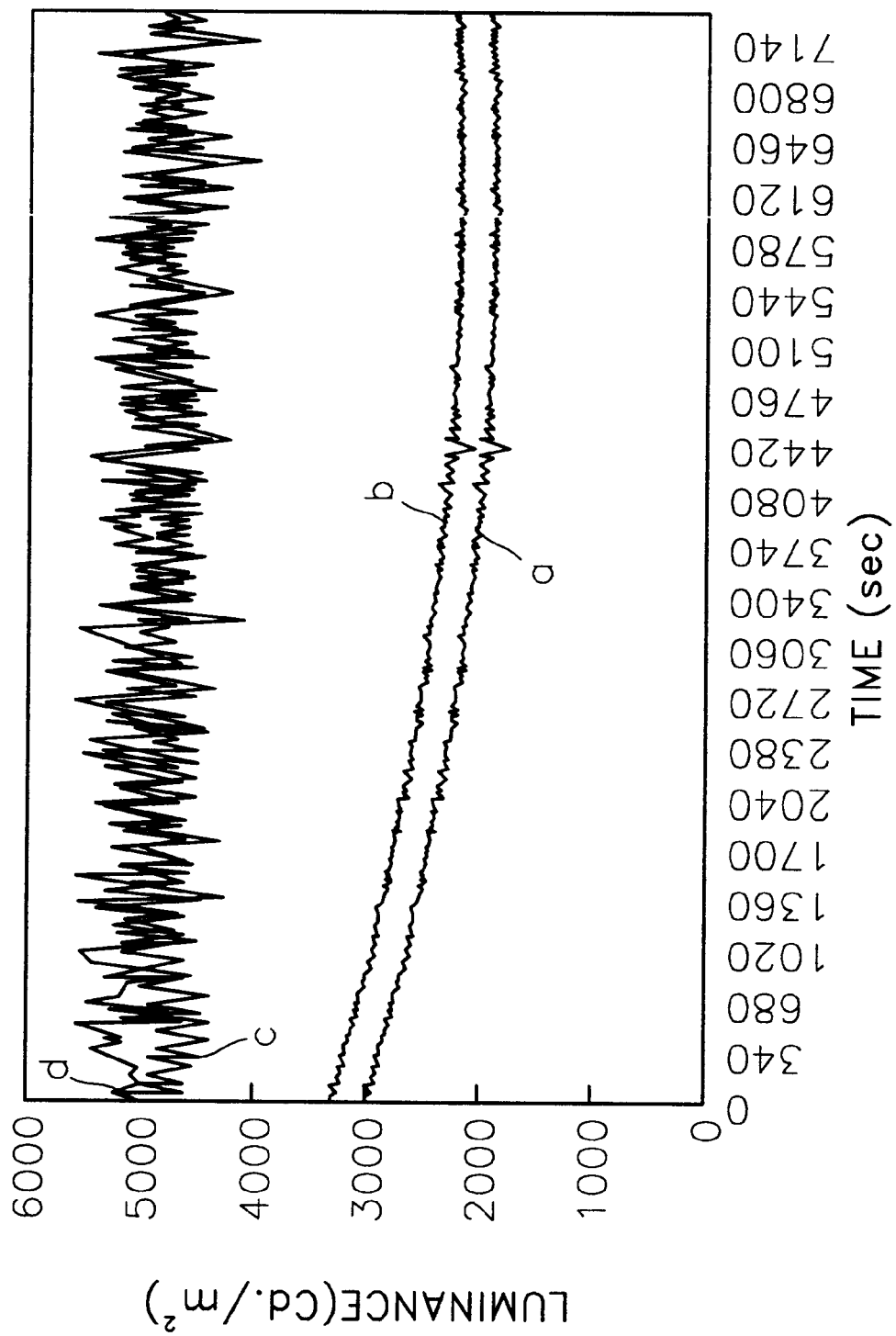
FIG. 1 is a graph illustrating the result of evaluating degradation characteristics after manufacturing screen layers using a $SrGa_2S_4$:Eu phosphor of the present invention and a prior art $Zn_2SiO_4$:Mn phosphor by sedimentation.

A mixed green-emitting phosphor composition comprising a $Y_2SiO_5$:Tb phosphor and a $SrGa_2S_4$:Eu phosphor according to the present invention is excellent in luminance, afterglow and degradation characteristics under the condition in which a high-density current is applied, so that it is capable of replacing a conventional green-emitting phosphor composition.

That is to say, since the $Y_2SiO_5$:Tb phosphor has poor color purity while exhibiting excellent luminance saturation characteristic and excellent degradation characteristic at high-voltage, high-current, it is used in a mixture with a $Zn_2SiO_4$:Mn phosphor having good color purity. However, the $Zn_2SiO_4$:Mn phosphor has a very long afterglow time, that is, about 30 ms, and is lowest in view of luminance and degradation characteristics among single-substance phosphors for a projection type CRT. Therefore, the green-emitting phosphor composition according to the present invention has improved luminance, degradation and afterglow characteristics by replacing a $Zn_2SiO_4$:Mn phosphor contained in the conventional green-emitting phosphor composition comprising a $Y_2SiO_5$:Tb phosphor and the $Zn_2SiO_4$:Mn phosphor, with a $SrGa_2S_4$:Eu phosphor having excellent luminance and degradation characteristics and a short afterglow time, that is, about 300 µs.

First, a method of manufacturing a $SrGa_2S_4$:Eu phosphor of the present invention will be described in detail.

0.5 to 1.5 mol of a strontium salt such as strontium carbonate or strontium sulfate, 1.5 to 2.5 mol of a gallium salt such as gallium oxide or gallium sulfate and 0.001 to 0.05 mol of europium oxide are mixed and then an appro priate amount of a solvent such as sodium bromide, ammonium chloride or sodium chloride is mixed therewith. Subsequently, the mixture is put into an alumina vessel and then baked at 700 to 900° C. under a hydrogen sulfide gas atmosphere for 1 to 4 hours. Then, the resultant material is cooled, washed, dried and sieved to obtain a $SrGa_2S_4$:Eu phosphor.

FIG. 1 is a graph illustrating the result of evaluating degradation characteristics after manufacturing screen layers using a $SrGa_2S_4$:Eu phosphor of the present invention and a prior art $Zn_2SiO_4$:Mn phosphor by sedimentation. The evaluation result is obtained using a demountable system. The evaluation conditions are acceleration voltage of 20 kV, a driving current $I_k$ of 40 μA, a raster size of 2.7 cm×2.7 cm and a degradation evaluation time of 120 minutes. In FIG. 1, curves a and b indicate degradation characteristics of a commercially available $Zn_2SiO4$: Mn phosphor of the prior art, and curves c and d indicate degradation characteristics of a $SrGa_2S_4$:Eu phosphor of the present invention. Here, the thicknesses of screen layers are all 5 mg/cm$^2$.

Referring to FIG. 1, after 120 minutes elapsed, the luminance persistence ratio of the $SrGa_2S_4$:Eu phosphor (curves c and d) was about 92%, that is, higher than that of the $Zn_2SiO_4$:Mn phosphor (curves a and b) of about 76%. This means that the degradation characteristic of the $SrGa_2S_4$:Eu phosphor is much better than that of the $Zn_2SiO_4$:Mn phosphor. Also, in view of initial luminance characteristics, the initial luminance of the $SrGa_2S_4$:Eu phosphor was about 48% higher than that of the $Zn_2SiO_4$:Mn phosphor. Thus, a difference in the luminance between the $SrGa_2S_4$:Eu phosphor and the $Zn_2SiO_4$:Mn phosphor become larger over time.

Thus, in the conventional green-emitting phosphor composition consisting of $Y_2SiO_5$:Tb phosphor and a $Zn_2SiO_4$:Mn phosphor, the $Zn_2SiO_4$:Mn phosphor is replaced with a $SrGa_2S_4$:Eu phosphor, thereby obtaining a green-emitting phosphor composition having improved luminance, afterglow and degradation characteristics.

Hereinbelow, the present invention is described more concretely with reference to specific examples intended to illustrate the invention without limiting the scope thereof.

EXAMPLE 1

95 wt % of a $Y_2SiO_5$:Tb phosphor and 5 wt % of a $SrGa_2S_4$:Eu phosphor were dry-mixed. The mixture was dispersed in a 0.1% $K_2SiO_3$ solution and mixed sufficiently. The dispersed mixture was added to a $Ba(NO_3)_2$ solution and a glass panel was put thereinto to then form a screen layer consisting of the mixture on the glass panel by sedimentation. The quantity of the mixed phosphor was adjusted so that the thickness of the screen layer corresponds to a layer weight of 5 mg/cm$^2$. After the screen layer has been coated with a lacquer film that can be evaporated by baking, a thin Al film was applied by vapor deposition. Finally, the resultant screen layer was baked out.

The relative luminance, color coordinates, afterglow time and degradation characteristic of the screen layer were evaluated using a demountable system, and the result is described in the following Table 1. The evaluation conditions were acceleration voltage of 20 kV, a driving current $I_k$ of 40 μA, a raster size of 2.7 cm×2.7 cm and a degradation evaluation time of 120 minutes.

In this example, the following examples and comparative example, the relative luminance is calculated on the assumption that the luminance measured for a screen layer formed using the mixed green-emitting phosphor composition consisting of 95 wt % of a $Y_2SiO_5$:Tb phosphor and 5 wt % of a $Zn_2SiO_4$:Mn phosphor, is 100%.

EXAMPLE 2

A screen layer was manufactured in the same manner as described for Example 1, except that 90 wt % of a $Y_2SiO_5$:Tb phosphor and 10 wt % of a $SrGa_2S_4$:Eu phosphor were used. The relative luminance, color coordinates, afterglow time and degradation characteristic were evaluated on the thus-manufactured screen layer, and the result is described in the following Table 1.

EXAMPLE 3

A screen layer was manufactured in the same manner as described for Example 1, except that 85 wt % of a $Y_2SiO_5$:Tb phosphor and 15 wt % of a $SrGa_2S_4$:Eu phosphor were used. The relative luminance, color coordinates, afterglow time and degradation characteristic were evaluated on the thus-manufactured screen layer, and the result is described in the following Table 1.

EXAMPLE 4

A screen layer was manufactured in the same manner as described for Example 1, except that 80 wt % of a $Y_2SiO_5$:Tb phosphor and 20 wt % of a $SrGa_2S_4$:Eu phosphor were used. The relative luminance, color coordinates, afterglow time and degradation characteristic were evaluated on the thus-manufactured screen layer, and the result is described in the following Table 1.

EXAMPLE 5

A screen layer was manufactured in the same manner as described for Example 1, except that 75 wt % of a $Y_2SiO_5$:Tb phosphor and 25 wt % of a $SrGa_2S_4$:Eu phosphor were used. The relative luminance, color coordinates, afterglow time and degradation characteristic were evaluated on the thus-manufactured screen layer, and the result is described in the following Table 1.

COMPARATIVE EXAMPLE

In the conventional green-emitting phosphor composition consisting of a $Y_2SiO_5$:Tb phosphor and a $Zn_2SiO_4$:Mn phosphor, it is widely known that the luminance characteristic was best when the mixture ratio of the $Y_2SiO_5$:Tb phosphor to the $Zn_2SiO_4$:Mn phosphor was 95:5. In this context, a screen layer was manufactured in the same manner as described for Example 1 to be used as a comparative standard, except that 95 wt % of a $Y_2SiO_5$:Tb phosphor and 5 wt % of a $ZnSiO_4$:Mn phosphor were used. The relative luminance, color coordinates, afterglow time and degradation characteristic of the thus-manufactured screen layer were evaluated on the thus-manufactured screen layer, and the result is described in the following Table 1.

TABLE 1

|  | Composition | | | Luminance[1] | Color coordinate | | Degradation |
| --- | --- | --- | --- | --- | --- | --- | --- |
|  | $Y_2SiO_5$:Tb (wt %) | $SrGa_2S_4$:Eu (wt %) | $Zn_2SiO_4$:Mn (wt %) | (%) | x | y | characteristic[2] |
| Example 1 | 95 | 5 | — | 105 | 0.333 | 0.584 | ○ |
| Example 2 | 90 | 10 | — | 104 | 0.331 | 0.588 | ⊙ |
| Example 3 | 85 | 15 | — | 103 | 0.328 | 0.593 | ⊙ |
| Example 4 | 80 | 20 | — | 102 | 0.324 | 0.600 | ○ |
| Example 5 | 75 | 25 | — | 100 | 0.320 | 0.608 | ○ |
| Comparative Example | 95 | — | 5 | 100 | 0.331 | 0.586 | Δ |

[1] Relative luminance when the luminance in Comparative Example is 100%
[2] Δ: Fair, ○: Good, ⊙: Excellent As shown in Table 1, the relative luminance of the mixed phosphor of Example 1, that is, 95 wt % of a $Y_2SiO_5$:Tb phosphor and 5 wt % of a $SrGa_2S_4$:Eu phosphor, was highest, that is, 105%, compared to the luminance of the mixed phosphor of Comparative Example, that is, 95 wt % of a $Y_2SiO_5$:Tb phosphor and 5 wt % of a $Zn_2SiO_4$:Eu phosphor. As the mixed quantity of the $SrGa_2S_4$:Eu phosphor increased (Examples 2 through 5), the luminance is reduced. When the mixed quantity of the $SrGa_2S_4$:Eu phosphor was 25 wt %, the luminance became equal to that of Comparative Example. Thus, the mixed quantity of the $SrGa_2S_4$:Eu phosphor exceeding 25 wt % is undesirable in view of luminance.

The mixed phosphors of Examples 1 through 5 and Comparative Example have substantially equal x and y values. That is to say, the mixed phosphors of Examples 1 through 5 have color coordinates usable as green-emitting phosphors.

The afterglow time of the mixed phosphor of Example 1 is shortened as the $SrGa_2S_4$:Eu phosphor content increases. Therefore, if a screen layer is manufactured using the mixed phosphor of Example 1, the afterglow time is short, which is advantageous in view of afterglow characteristic. As the mixed quantity of the $SrGa_2S_4$:Eu phosphor increases (Examples 2 through 5), the afterglow time is further reduced. Thus, in view of afterglow characteristic only, it is desirable to increase the mixed quantity of the $SrGa_2S_4$:Eu phosphor.

In view of degradation characteristic, the mixed phosphor compositions of Examples 1 through 5 are seldom degraded compared to the phosphor composition of Comparative Example.

As described above, the $SrGa_2S_4$:Eu phosphor according to the present invention has excellent luminance, afterglow and degradation (life) characteristics under the condition in which a high-density current is applied, so that it can replace a conventional $Zn_2SiO_4$:Mn phosphor. In other-words, a mixed green-emitting phosphor of a $Y_2SiO_5$:Tb phosphor and a, $SrGa_2S_4$:Eu phosphor have improved luminance, afterglow and degradation characteristics compared to the conventional mixed green-emitting phosphor of a $Y_2SiO_5$:Tb phosphor and a $Zn_2SiO_4$:Mn phosphor.

What is claimed is:

1. A green-emitting phosphor composition comprising: 75 to 95 wt % of a phosphor of the formula $Y_2SiO_5$:Tb, and 5 to 25 wt % of a phosphor of the formula $SrGa_2S_4$:Eu.

2. The green-emitting phosphor composition according to claim 1, wherein the phosphor of the formula $Y_2SiO_5$:Tb contained in the composition is 85 to 95 wt %, and the phosphor of the formula $SrGa_2S_4$:Eu contained in the composition is 10 to 15 wt %.

3. A cathode ray tube manufactured using a green-emitting phosphor composition as claimed in claim 1.

* * * * *